United States Patent Office 3,337,371
Patented Aug. 22, 1967

3,337,371
COMPENSATION WIRE FOR CHROMEL-ALUMEL THERMOCOUPLES
Andrei Karpovich Agafonov and Igor Alexandrovich Alexakhin, Moscow, Galina Nickolaevna Pokrovskaja, Kamenskuraljsky, and Josif Lazarevich Rogeljberg and Efim Samoilovich Shpichinetsky, Moscow, U.S.S.R., assignors to Gosudarstvenny Nauchno-Issledovateljsky i Proektny Institute Splavov i Obrabotki Tsvetnykh Metallov, Moscow, U.S.S.R.
No Drawing. Filed June 3, 1964, Ser. No. 372,402
1 Claim. (Cl. 136—227)

This invention relates to compensation (extension) wires for Chromel-Alumel thermocouples, which are to be used in cases when their reference junctions are subjected to temperature variations within a wide range, especially in the range from —50° to +400° C.

Temperature measurements with a thermocouple are subject to errors due to temperature variations of the thermocouple reference junction. To eliminate these errors the so-called compensation (extension) wires are used by means of which the reference junction may be placed in a constant temperature zone.

In many cases due to high temperature ratings of modern power plants, heaters, engines, furnaces, etc. where the temperature is measured with help of thermocouples as well as due to the requirements for small-size thermocouple pickups for temperature measurements, the temperature of the thermocouple reference junctions attains very high levels (300°–400° C.) and requires the employment of compensation (extension) wires.

At present, temperature is most often measured with Chromel-Alumel thermocouples. Compensation (extension) wires for such thermocouples have two strands, one of which is made of copper and the other of constantan.

Compensation wires with strands of copper and constantan are employed in cases when the reference junction temperature does not exceed 100° C., since at temperatures up to 100° C. the thermo-electromotive force (T.E.M.F.) of these compensation wires is the same as that of the Chrmel-Alumel couple.

In Chromel-Alumel thermocouples with reference junctions at temperatures up to 200° C. compensation wires of iron (positive strand) and a copper-nickel alloy (negative strand) are used. The T.E.M.F. of this wire couple is equal to that of the Chromel-Alumel couple at temperatures not exceeding 200° C.

If, however, the temperature of the thermocouple reference junction exceeds 200° C., the compensation wires with iron and copper-nickel strands, as well as the copper and constantan on strands, can no longer be used as the T.E.M.F. of the compensation wires at this temperature greatly differs from that of the Chromel-Alumel thermocouple. Thus, an error is introduced in the results of thermocouple measurements which is inconsistent in value and may attain some dozens of degrees.

The object of the present invention is to provide compensation wires that permit variations of the thermocouple reference junction temperature within the range characteristic of reference junctions of conventional temperature pickups which are used to control the temperature of modern engines, power plants, heaters, etc., i.e. within the range from —50° to +400° C.

To attain this object, such alloys are chosen which, when arranged in a couple, produce a T.E.M.F. equal to, or only slightly different from, that of a Chromel-Alumel thermocouple within the proposed temperature range.

The alloys according to the invention provide a solution of the problem. The positive strand should be manufactured of a copper-titanium alloy containing 0.2–0.8 percent of titanium, the rest is copper, the negative strand is manufactured of a nickel-copper alloy containing 14 to 20 percent of copper, the rest is nickel. Deoxydation, degassing and desulphurization of the alloys from which compensation wires are manufactured can be effected by introducing in said alloys such additives as 0.0 to 0.3 percent of manganese, 0.0 to 0.3 percent of magnesium, 0.0 to 0.1 percent of phosphorus and 0.00 to 0.05 percent of lithium for the positive strand alloy, and 0.0 to 0.1 percent of iron, 0.00 to 0.15 percent of carbon, 0.0 to 1.0 percent of manganese, 0.00 to 0.15 percent of magnesium, .00 to 0.05 percent of lithium and 0.00 to 0.5 percent of cerium for the negative strand alloy.

The T.E.M.F. generated by the compensation (extension) wires according to the invention is equal to, or slightly different from, that of a Chromel-Alumel thermocouple within the temperature range from —50° to +400° C., the deviation being of the order of ±5°.

The resistivity of the positive strand of the compensation wire is 0.08 ohm mm.$^2$/m. and that of the negative strand is 0.24 ohm mm.$^2$/m., i.e. the ohmic resistance of the new compensation wire is approximately three times lower than that of the Chromel-Alumel couple.

THERMO-ELECTROMOTIVE FORCE OF THE CHROMEL-ALUMEL THERMOCOUPLE AND THE COMPENSATION WIRES ACCORDING TO THE INVENTION

| Couple | Alloy composition, percent | | | | | Thermo-electromotive force, mv., at reference junction temperature, degree C. | | | | |
|---|---|---|---|---|---|---|---|---|---|---|
| | Positive strand | | Negative strand | | | | | | | |
| | Cu | Ti | Ni | Cu | Fe+Mn | —50 | 100 | 200 | 300 | 400 |
| Compensation wire | 99.46 | 0.54 | 84 | 15.6 | 0.4 | —1.85 | 4.11 | 8.16 | 12.09 | 16.44 |
| | 99.74 | 0.26 | 80 | 19.6 | 0.4 | —1.80 | 3.99 | 7.95 | 12.02 | 16.55 |
| Chromel-Alumel | | | | | | —1.86 | 4.10 | 8.13 | 12.21 | 16.40 |

What we claim is:

A compensation wire for a Chromel-Alumel thermocouple, consisting of a positive and a negative strand coupled to the thermocouple and adapted to operate under conditions in which the temperature of the thermocouple reference junction can vary from —50° to +400° C., the positive strand being constituted of a copper-titanium alloy containing 0.2 to 0.8 percent of titanium, 0.0 to 0.3 percent of manganese, 0.0 to 0.3 percent of magnesium, 0.0 to 0.1 percent of phosphorus, 0.00 to 0.05 percent of lithium, the rest being copper, and the negative strand being constituted of a nickel-copper alloy containing 14 to 20 percent of copper, 0.0 to 1.0 percent of iron, 0.00 to 0.15 percent of carbon, 0.0 to 1.0 percent of manganese, 0.00 to 0.15 percent of magnesium, 0.00 to 0.05 percent of lithium, 0.00 to 0.05 percent of cerium, the rest being nickel.

(References on following page)

References Cited

UNITED STATES PATENTS

| | | | |
|---|---|---|---|
| 1,025,715 | 5/1912 | Peake | 136—227 X |
| 1,315,205 | 9/1919 | Bristol | 136—241 X |
| 1,468,456 | 9/1923 | Bristol | 136—241 X |
| 1,561,593 | 11/1925 | Brown | 136—241 |
| 2,224,573 | 12/1940 | Hunter | 136—239 |
| 2,466,202 | 4/1949 | Brenner | 136—241 X |

FOREIGN PATENTS 1,154,641   9/1963   Germany.

OTHER REFERENCES

Instruments, August 1945, page 539.

CHARLES N. LOVELL, *Primary Examiner.*

HYLAND BIZOT, *Examiner.*